US012418743B2

(12) United States Patent
Tsai et al.

(10) Patent No.: US 12,418,743 B2
(45) Date of Patent: Sep. 16, 2025

(54) HEADPHONE AND OPERATION METHOD THEREOF

(71) Applicant: Merry Electronics(Shenzhen) Co., Ltd., ShenZhen (CN)

(72) Inventors: Ming-Hung Tsai, Taichung (TW); Chung-Yi Huang, Taichung (TW); Po-Yu Hung, Taichung (TW)

(73) Assignee: Merry Electronics(Shenzhen) Co., Ltd., Shenzhen (CN)

(*) Notice: Subject to any disclaimer, the term of this patent is extended or adjusted under 35 U.S.C. 154(b) by 191 days.

(21) Appl. No.: 18/520,573

(22) Filed: Nov. 28, 2023

(65) Prior Publication Data

US 2025/0142247 A1 May 1, 2025

(30) Foreign Application Priority Data

Oct. 25, 2023 (TW) ................................ 112140812

(51) Int. Cl.
*H04R 1/22* (2006.01)
*H04R 1/10* (2006.01)

(52) U.S. Cl.
CPC ................. *H04R 1/22* (2013.01); *H04R 1/10* (2013.01)

(58) Field of Classification Search
CPC ...... H04R 1/1041; H04R 1/1008; H04R 1/10; H04R 1/22; H04R 3/04; H04R 5/033; H04R 5/0335
See application file for complete search history.

(56) References Cited

U.S. PATENT DOCUMENTS 10,057,674 B1 * 8/2018 Tseng .................. H04R 1/1041
2013/0129106 A1 * 5/2013 Sapiejewski ........... H04R 1/105 381/71.6
2019/0238968 A1 * 8/2019 Hajati .................... H04R 5/033

* cited by examiner

*Primary Examiner* — Kile O Blair
(74) *Attorney, Agent, or Firm* — JCIPRNET

(57) ABSTRACT

Disclosed are a headphone and an operating method thereof. The headphone includes a headband frame, a speaker module, a detector and a controller. The speaker module is disposed on the headband frame. The detector is disposed in the headband frame and detect stress changes on the headband frame to output a frequency response voltage value. The controller is electrically connected to the speaker module and the detector, and receives the frequency response voltage value. The controller determines whether the frequency response voltage value is the same as a target frequency response voltage value to read a target frequency response parameter corresponding to the target frequency response voltage value. The controller drives the speaker module according to the target frequency response parameter.

20 Claims, 7 Drawing Sheets

HEADPHONE AND OPERATION METHOD THEREOF

CROSS-REFERENCE TO RELATED APPLICATION

This application claims the priority benefit of Taiwan patent application no. 112140812, filed on Oct. 25, 2023. The entirety of the above-mentioned patent application is hereby incorporated by reference herein and made a part of this specification.

BACKGROUND

Technical Field

The present disclosure relates to an audio playback device, and in particular to a headphone and an operation method thereof.

Description of Related Art

When using a conventional headphone, due to differences in head sizes of different users, different users might have different hearing experiences, which in turn results in differences in the audio quality received by different users.

SUMMARY

The present disclosure provides a headphone and an operation method thereof, which may provide good audio playback effects.

The headphone of the present disclosure includes a headband frame, a speaker module, a detector and a controller. The speaker module is disposed on the headband frame. The detector is disposed in the headband frame and is disposed to detect the stress change on the headband frame to output a frequency response voltage value. The controller is electrically connected to the speaker module and the detector, and is disposed to receive the frequency response voltage value. The controller determines whether the frequency response voltage value is the same as the target frequency response voltage value to read the target frequency response parameter corresponding to the target frequency response voltage value to drive the speaker module.

The operation method of the present disclosure is suitable for a headphone. The headphone includes a headband frame, a speaker module, a detector and a controller. The speaker module is disposed on the headband frame, and the detector is disposed in the headband frame. The operation method includes the following steps: detecting the stress change on the headband frame through the detector to output the frequency response voltage value; receiving the frequency response voltage value through the controller; determining whether the frequency response voltage value is the same as the target frequency response voltage value through the controller to read the target frequency response parameter corresponding to the target frequency response voltage value; and driving the speaker module according to the target frequency response parameter through the controller.

Based on the above, the headphone and the operation method thereof in the present disclosure may automatically detect the stress change on the headband frame and adjust the frequency response parameters accordingly to drive the speaker module.

In order to make the above-mentioned features and advantages of the present disclosure more obvious and easy to understand, embodiments are given below and described in detail with reference to the attached drawings.

DESCRIPTION OF THE EMBODIMENTS

Figure 1:
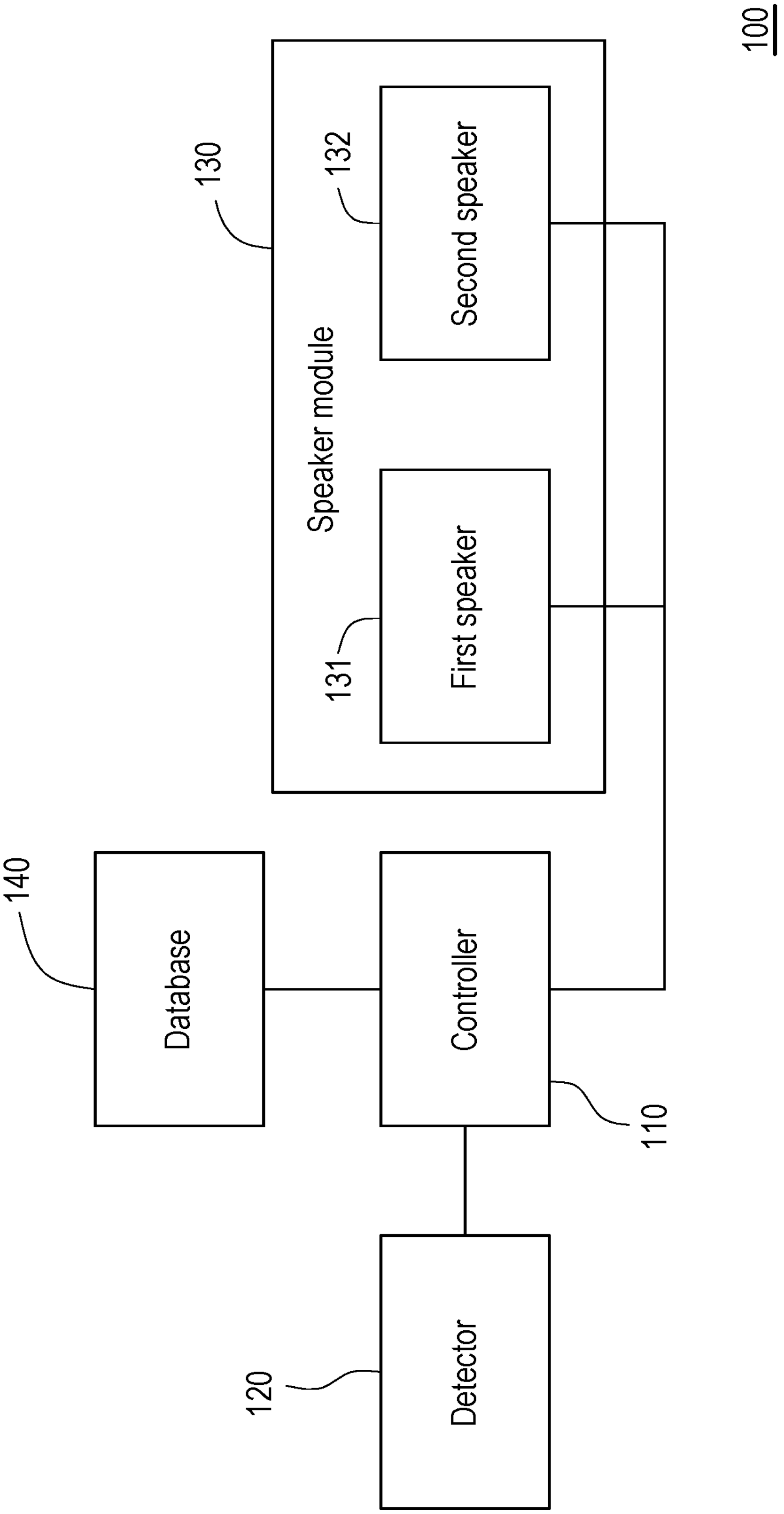
FIG. 1 is a schematic circuit diagram of a headphone according to an embodiment of the present disclosure.

Reference will now be made in detail to the exemplary embodiments of the present disclosure, examples of which are illustrated in the accompanying drawings. Whenever possible, the same reference numbers are used in the drawings and descriptions to refer to the same or similar parts.

FIG. 1 is a schematic circuit diagram of a headphone according to an embodiment of the present disclosure. Referring to FIG. 1, the headphone 100 includes a controller 110, a detector 120, a speaker module 130 and a database 140. The controller 110 is electrically connected to the detector 120, the speaker module 130 and the database 140. In this embodiment, the controller 110 may be a control circuit, such as a microcontroller unit (MCU), a digital signal processor (DSP), a system in a chip (SoC) or the like. The detector 120 may be a stress detector or a force-sensitive resistor (FSR). The speaker module 130 includes a first speaker 131 and a second speaker 132, and the first speaker 131 and the second speaker 132 are electrically connected to the controller 110. The database 140 may be implemented as a memory or a related storage device, or may also be implemented as a memory device provided in the controller 110. In this embodiment, the database 140 may store the target frequency response voltage value, the target frequency response parameters, the built-in frequency response voltage value and the built-in frequency response parameters described in various embodiments of the present disclosure.

Figure 2:
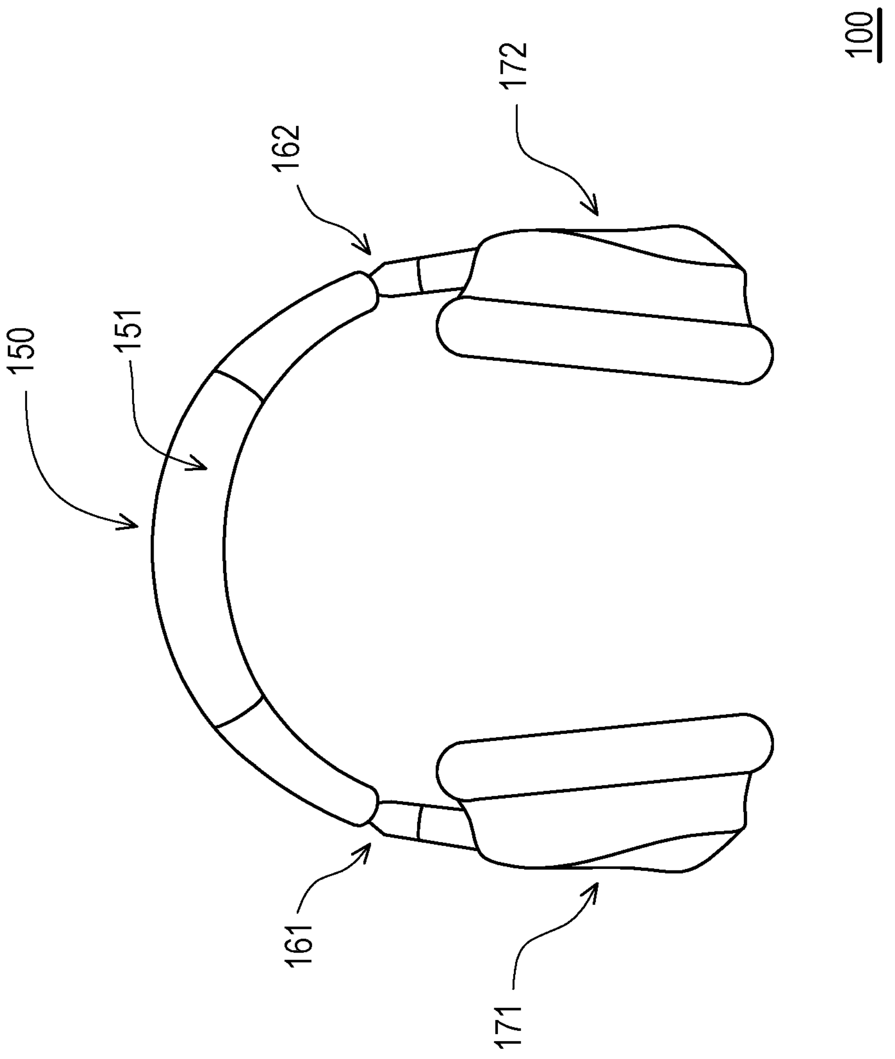
FIG. 2 is a structural diagram of a headphone according to an embodiment of the present disclosure.

FIG. 2 is a structural diagram of a headphone according to an embodiment of the present disclosure. Referring to FIG. 1 and FIG. 2, in this embodiment, the headphone 100 further includes a headband frame 150, a first stretching mechanism 161, a second stretching mechanism 162, a first earmuff 171 and a second earmuff 172. The first earmuff 171 is disposed at one end of the headband frame 150 through the first stretching mechanism 161. The second earmuff 172 is disposed at the other end of the headband frame 150 through the second stretching mechanism 162. In this embodiment, the detector 120 may be disposed in the headband region 151 of the headband frame 150, and is disposed to detect the stress change on the headband frame 150, and output the corresponding voltage value to the controller 110 based on the related circuit matched with the detector 120, wherein the corresponding voltage value may serve as the frequency response voltage value referred to in various embodiments of the present disclosure. The first speaker 131 may be disposed in the first earmuff 171. The second speaker 132 may be disposed in the second earmuff 172. The controller 110 may drive the first speaker 131 and the second speaker 132 to play audio according to the frequency response parameter. In addition, the controller 110 and the database 140 may be disposed in the headband frame 150, or in the first earmuff 171 or the second earmuff 172, and the present disclosure is not limited thereto.

Figure 3:
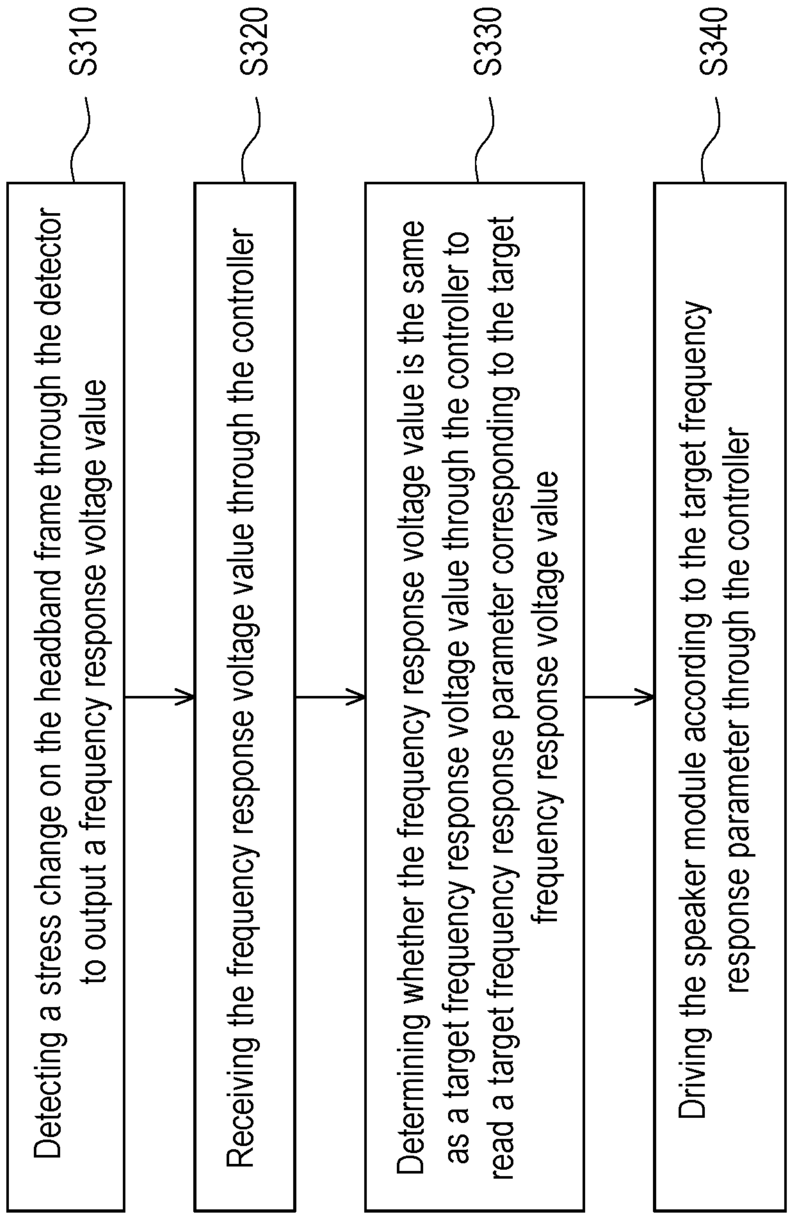
FIG. 3 is a flow chart of an operation method of a headphone according to an embodiment of the present disclosure.

FIG. 3 is a flow chart of an operation method of a headphone according to an embodiment of the present disclosure. Referring to FIG. 1 to FIG. 3, in this embodiment, when the user wears the headphone 100, the headphone 100 may perform operations as described in the following steps S310 to S340. In step S310, the detector 120 may detect the stress change on the headband frame 150 to output a frequency response voltage value. The stress change on the headband frame 150 refers to the stress change caused by the deformation of the headband frame 150 when being worn by the user.

In this regard, assuming that the width of the user's head (such as width of cheek or distance between ears) is wider, the distance between the first earmuff 171 and the second earmuff 172 is long, and therefore the stress applied on the headband frame 150 is also high. In contrast, if the width of the user's head is narrow, the distance between the first earmuff 171 and the second earmuff 172 is short, and therefore the stress applied on the headband frame 150 is also low. In addition, when the width of head is fixed, assuming that the length of the user's head (such as the distance from the top of the head to the center of the ears) is long, the user may elongate the first stretching mechanism 161 and the second stretching mechanism 162, and the stress applied on the headband frame 150 may be reduced. In contrast, when the width of the headband is fixed, assuming that the length of the user's head is short, the user may shorten the first stretching mechanism 161 and the second stretching mechanism 162, and the stress applied on the headband frame 150 may be increased.

In other words, when different users have different head widths and/or head lengths, the stress caused to the headband frame 150 varies when different users wear the headphone 100. More importantly, since the extent of deformation of the headband frame 150 is related to how much the first earmuff 171 and the second earmuff 172 fit the user's ears respectively, from another perspective, the stress caused to the headband frame 150 changes along with the extent to which the first earmuff 171 and the second earmuff 172 fit the user's ears respectively. Therefore, the headphone 100 of this embodiment may use the stress change caused to the headband frame 150 as an adjustment basis for determining the frequency response parameters of the audio playback modes of the first speaker 131 and the second speaker 132.

In step S320, the controller 110 may receive a frequency response voltage value corresponding to the stress level of the current headband frame 150 from the detector 120. In step S330, the controller 110 may determine whether the frequency response voltage value is the same as the target frequency response voltage value to read the target frequency response parameter corresponding to the target frequency response voltage value. If the frequency response voltage value is the same as the target frequency response voltage value, in step S340, the controller 110 may drive the first speaker 131 and the second speaker 132 of the speaker module 130 according to the target frequency response parameter.

Specifically, the target frequency response parameter may be an ideal frequency response parameter, which means that the first speaker 131 and the second speaker 132 may be operated in a specific audio playback mode so that the preset user subject is able to receive an ideal audio quality. The controller 110 may compare whether the current frequency response voltage value is the same as the target frequency response voltage value. If they are the same, the controller 110 may directly use the target frequency response parameter corresponding to the target frequency response voltage value to drive the first speaker 131 and the second speaker 132. If they are not the same, the controller 110 may read the database 140 to select the built-in frequency response parameter corresponding to the built-in frequency response voltage value that is closest to or the same as the frequency response voltage value to drive the first speaker 131 and the second speaker 132 of the speaker module 130 to adjust the audio playback modes of the first speaker 131 and the second speaker 132 accordingly, so that the audio quality received by the user through the first speaker 131 and the second speaker 132 may be close to or equal to the ideal audio quality.

Figure 4B:
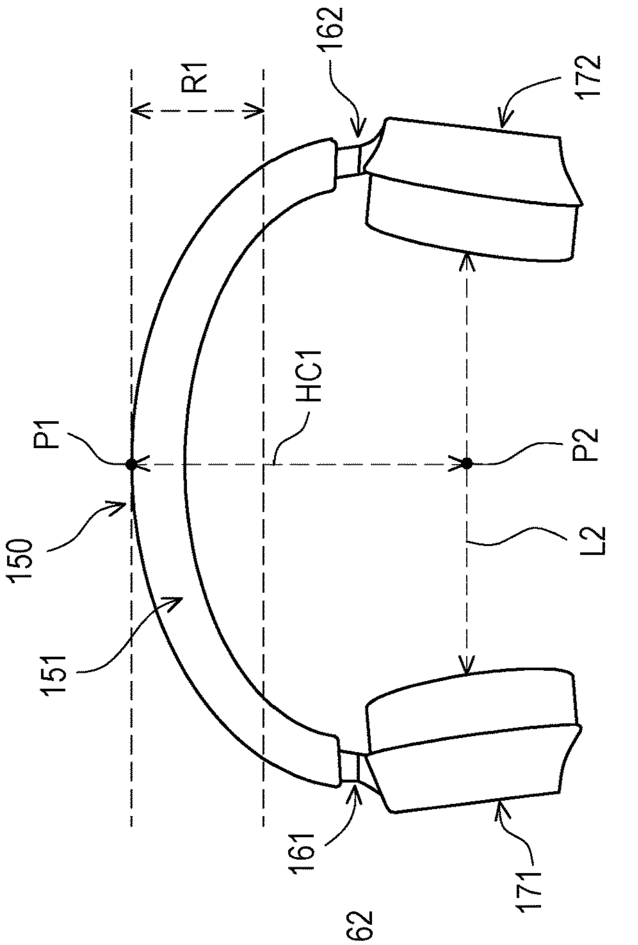
FIG. 4A to FIG. 4D are schematic diagrams of various scenarios of using the headphone according to multiple embodiments of the present disclosure.
Figure 4A:
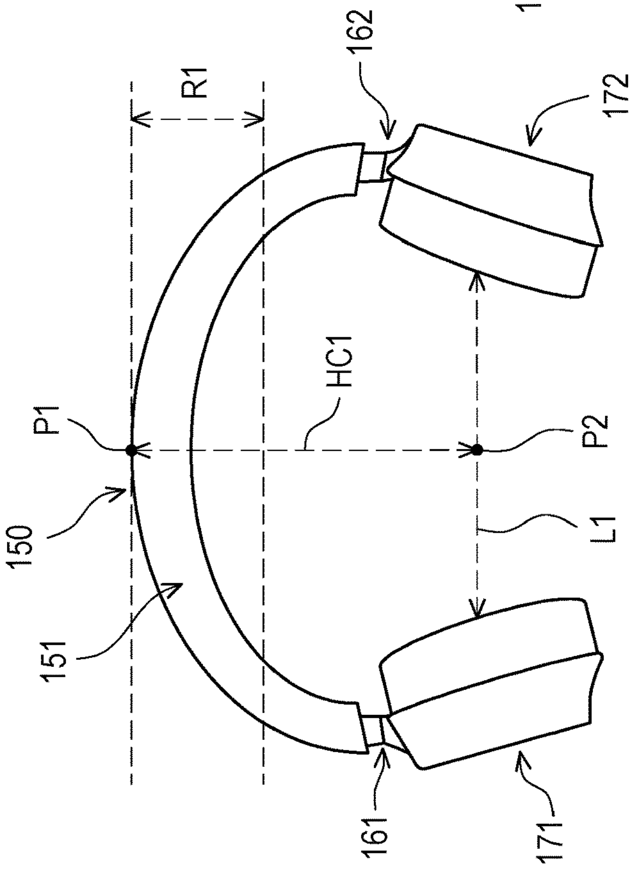

FIG. 4A to FIG. 4D are schematic diagrams of various scenarios of using the headphone according to multiple embodiments of the present disclosure. Referring to FIG. 4A, assuming that the head width of the user wearing the headphone 100 is narrow (the head width is, for example, 132 millimeters (mm)) and the head length of the user is short, when the first stretching mechanism 161 and the second stretching mechanism 162 are in an unstretched state, there is a first height HC1 (for example, 122 mm) from the headband center point P1 to the earmuff center point P2, and there is a distance L1 between the first earmuff 171 and the second earmuff 172.

Referring to FIG. 4B, assuming that the head width of the user wearing the headphone 100 is wide (for example, the head width is 169 mm) and the head length of the user is short, when the first stretching mechanism 161 and the second stretching mechanism 162 are in an unstretched state, there is a first height HC1 (for example, 122 mm) from the headband center point P1 to the earmuff center point P2, and there is a distance L2 between the first earmuff 171 and the second earmuff 172.

Figure 4D:
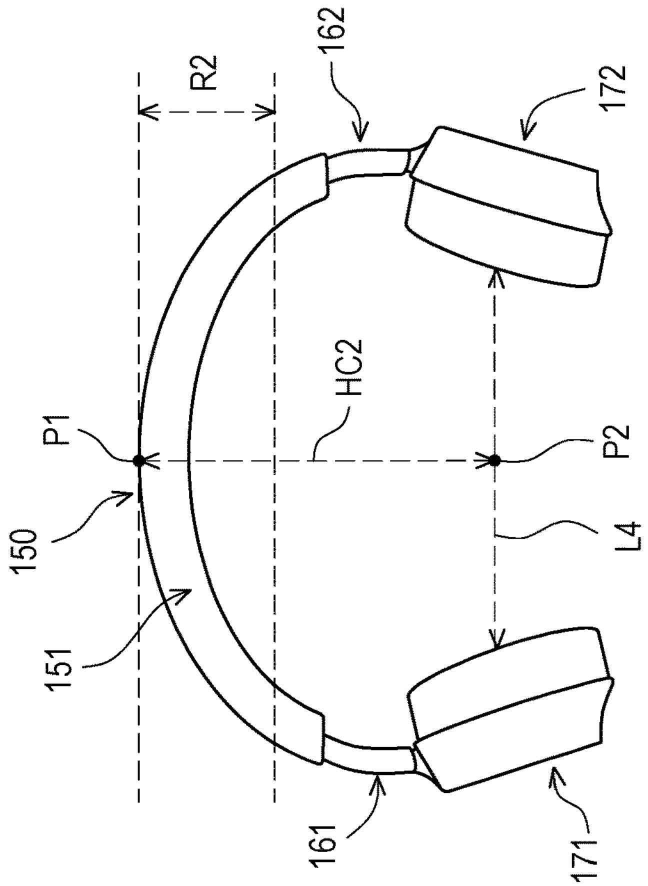
Figure 4C:
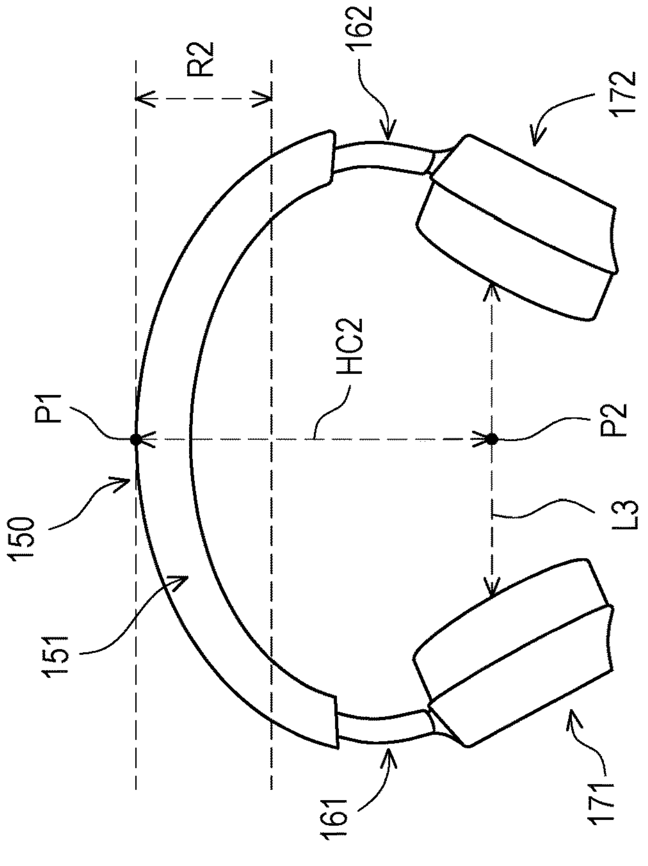

Referring to FIG. 4C, assuming that the head width of the user wearing the headphone 100 is narrow (for example, the head width is 132 mm) and the head length of the user is long, when the first stretching mechanism 161 and the second stretching mechanism 162 are in a stretched state, there is a second height HC2 (for example, 146 mm) from the headband center point P1 to the earmuff center point P2, and there is a distance L3 between the first earmuff 171 and the second earmuff 172.

Referring to FIG. 4D, assuming that the head width of the user wearing the headphone 100 is wide (for example, the head width is 169 mm) and the head length of the user is long, when the first stretching mechanism 161 and the second stretching mechanism 162 are in a stretched state, there is a second height HC2 (for example, 146 mm) from the headband center point P1 to the earmuff center point P2, and there is a distance L4 between the first earmuff 171 and the second earmuff 172.

In light of the foregoing, as shown in FIG. 4A to FIG. 4D, in the above four scenarios, the distance L2 may be a maximum distance, and the distance L3 may be a minimum distance. The distance L2 is greater than the distance L4. The distance L4 is greater than the distance L1. The distance L1 is greater than the distance L3. Therefore, it can be known that the headband frame 150 may have a maximum stress value in the application scenario shown in FIG. 4B (that is, the clamping force generated by the headband frame 150, the first earmuff 171 and the second earmuff 172 is relatively large). The headband frame 150 may have the second largest stress value in the application scenario shown in FIG. 4D (that is, the clamping force generated by the headband frame 150, the first earmuff 171 and the second earmuff 172 is the second largest). The headband frame 150 may have the third largest stress value in the application scenario shown in FIG. 4A (that is, the clamping force generated by the headband frame 150, the first earmuff 171 and the second earmuff 172 is the third largest). The headband frame 150 may have the smallest stress value in the application scenario shown in FIG. 4C (that is, the clamping force generated by the headband frame 150, the first earmuff 171 and the second earmuff 172 is the smallest). In this way, the controller 110 may determine whether to drive the first speaker 131 and the second speaker 132 according to the target frequency response parameter or the built-in frequency response parameter based on the frequency response voltage value output by the detector 120.

Figure 5:
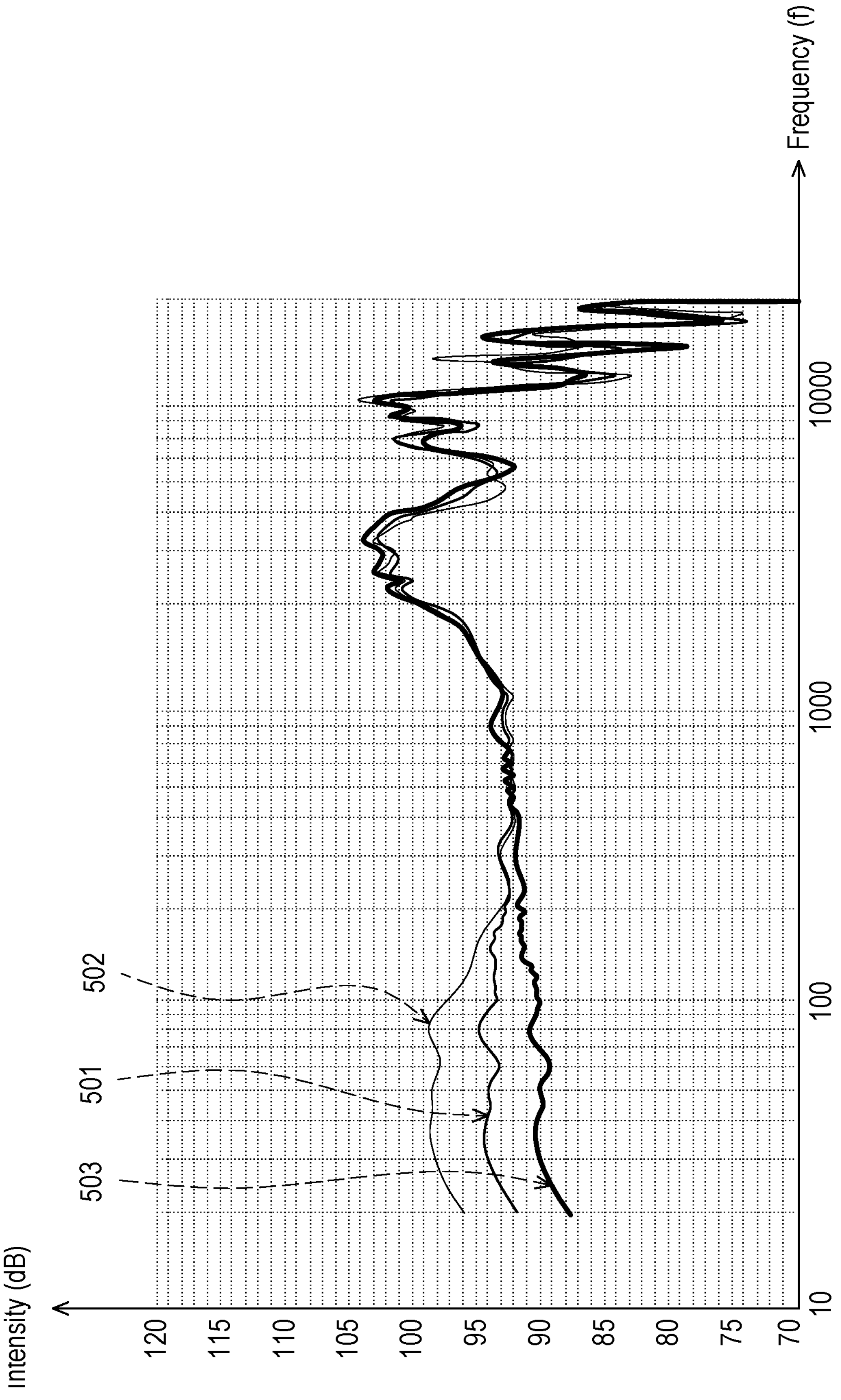
FIG. 5 is a schematic diagram of a frequency response curve according to an embodiment of the present disclosure.

Further, refer to FIG. 5, which is a schematic diagram of a frequency response curve according to an embodiment of the present disclosure. For example, the target frequency response parameter may make the audio played by the first speaker 131 and the second speaker 132 heard by the user to have an ideal frequency response curve 501 as shown in FIG. 5. However, in the case where the clamping force generated by the headband frame 150, the first earmuff 171 and the second earmuff 172 is relatively large, the frequency response parameter may correspond to the frequency response curve 502 as shown in FIG. 5. In this regard, since the sound leaks less from the front cavities of the first earmuff 171 and the second earmuff 172, the user might experience the low frequency more significantly when listening to audio. Therefore, the controller 110 may change the currently used frequency response parameter (adjusted through the built-in frequency response parameter) to moderately reduce the frequency response curve of the low frequency, so that the frequency response curve of the audio heard by the user is able to be close to the ideal frequency response curve 501.

In contrast, when the clamping force generated by the headband frame 150, the first earmuff 171 and the second earmuff 172 is relatively small, the frequency response parameter may correspond to the frequency response curve 503 as shown in FIG. 5. In this regard, since the sound leaks more from the front cavities of the first earmuff 171 and the second earmuff 172, the user might experience the low frequency less significantly when listening to audio. Therefore, the controller 110 may change the currently used frequency response parameter (adjusted through another built-in frequency response parameter) to moderately increase the frequency response curve of the low frequency, so that the frequency response curve of the audio heard by the user is able to be close to the ideal frequency response curve 501.

In addition, regarding the position design of the headband region 151 on the headband frame 150, please refer to FIG. 4A to FIG. 4D. When the first stretching mechanism 161 and the second stretching mechanism 162 in FIG. 4A and FIG. 4B are in the unstretched state, the deformation amount of the headband frame 150 is concentrated on both sides of the headband center point P1, so the headband region 151 where the detector 120 is disposed may be preferably the proportional region corresponding to the first reference height R1 of the headband frame 150 from the headband center point P1 to the earmuff center point P2 between the first earmuff 171 and the second earmuff 172. The first reference height R1 is equal to the result of multiplying the first height HC1 by the preset ratio. Moreover, when the first stretching mechanism 161 and the second stretching mechanism 162 in FIG. 4C and FIG. 4D are in the stretched state, the deformation amount of the headband frame 150 is also concentrated on both sides of the headband center point P1, so the headband region 151 where the detector 120 is disposed may be preferably the proportional region corresponding to the second reference height R2 of the headband frame 150 from the headband center point P1 to the earmuff center point P2 between the first earmuff 171 and the second earmuff 172. The second reference height R2 is equal to the result of multiplying the second height HC2 by the preset ratio.

Therefore, based on the difference between the unstretched state and the stretched state of the first stretching mechanism 161 and the second stretching mechanism 162, the headband region 151 where the detector 120 is disposed in this embodiment may be the preset proportional region corresponding to the preset height of the headband frame 150 from the headband center point P1 to the earmuff center point P2. The preset height may be between (selectable from) the first reference height R1 and the second reference height R2. In an embodiment, the first height HC1 may be 122 mm, the second height HC2 may be 146 mm, and the preset ratio is 20%, but the disclosure is not limited thereto.

Figure 6:
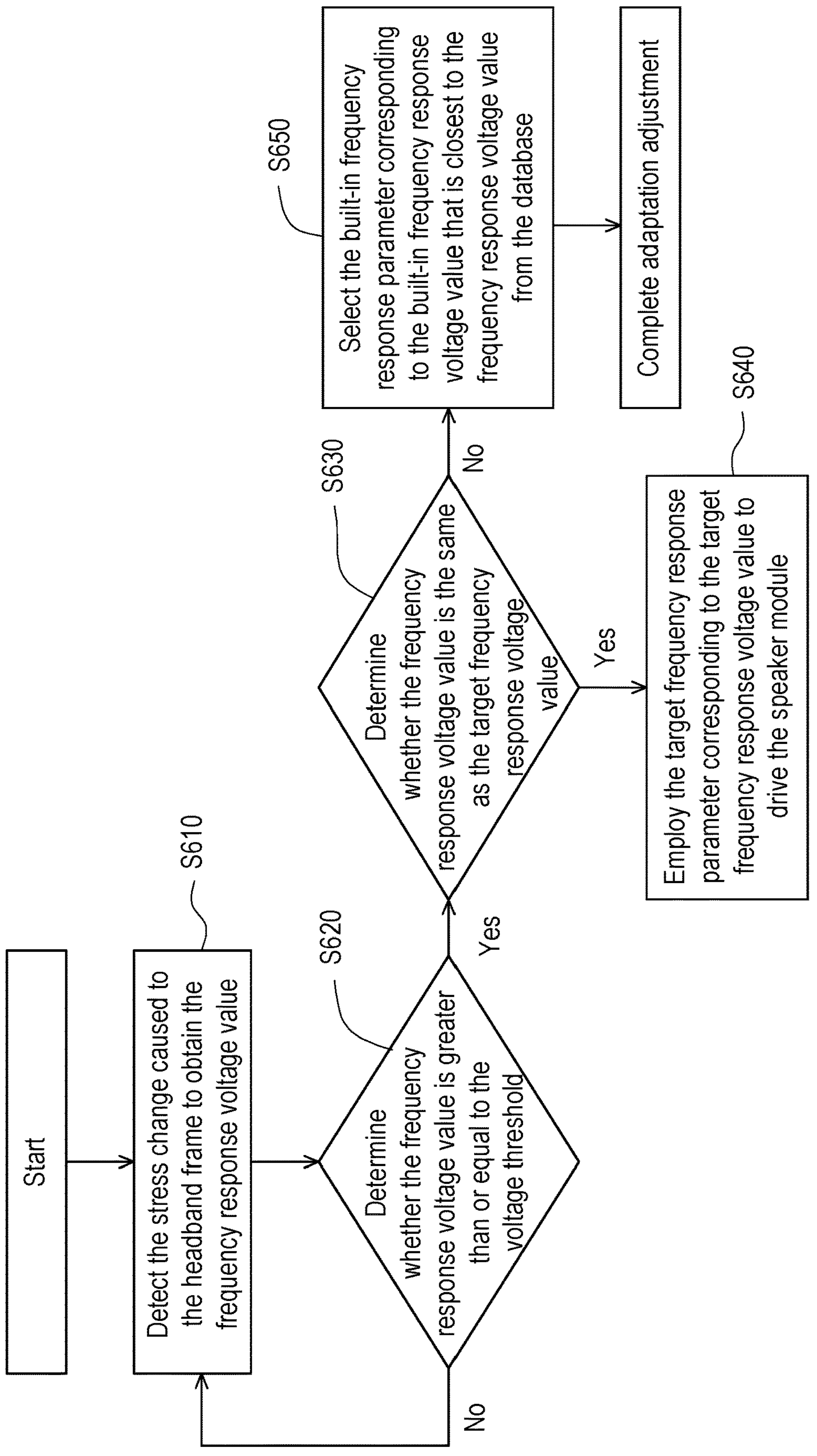
FIG. 6 is a flow chart of an operation method of a headphone according to another embodiment of the present disclosure.

FIG. 6 is a flow chart of an operation method of a headphone according to another embodiment of the present disclosure. Referring to FIG. 1, FIG. 2 and FIG. 6, in step S610, the detector 120 may detect the stress change caused to the headband frame 150 to obtain the frequency response voltage value. The detector 120 may output the frequency response voltage value to the controller 110. In step S620, the detector 120 determines whether the frequency response voltage value is greater than or equal to the voltage threshold to determine whether to further determine whether the frequency response voltage value is the same as the target frequency response voltage value. Specifically, the controller 110 may verify whether the user is wearing the headphone 100 by judging whether the frequency response voltage value is greater than or equal to the voltage threshold. It should be noted that the voltage threshold may be, for example, the preset minimum voltage value (i.e., as the trigger voltage value) that is generated by the detector 120 through detection when the headphone 100 is being worn during the product manufacturing process. If the frequency response voltage value is not greater than or equal to the voltage threshold, the controller 110 may re-execute step S610. If the frequency response voltage value is greater than or equal to the voltage threshold, in step S630, the controller 110 may further determine whether the frequency response voltage value is the same as the target frequency response voltage value.

If the frequency response voltage value is the same as the target frequency response voltage value, in step S640, the controller 110 may employ the target frequency response parameter corresponding to the target frequency response voltage value to drive the first speaker 131 and the second speaker 132 of the speaker module 130. Otherwise, in step S650, the controller 110 may select the built-in frequency response parameter corresponding to the built-in frequency response voltage value that is closest to or the same as the frequency response voltage value from the database 140 to drive the speaker module 130 to complete the adaptation adjustment. Therefore, the headphone 100 and the operating method thereof in this embodiment may effectively and automatically adjust the audio quality provided by the first speaker 131 and the second speaker 132 of the speaker module 130.

It should be noted that the database 140 may be established during the product design and manufacturing process, for example. The database 140 may record multiple built-in frequency response voltage values and multiple built-in frequency response parameters corresponding to the multiple built-in frequency response voltage values. In this regard, under the circumstances where the headband frame 150 applies different clamping forces, the voltage values output by the detector 120 may be collected as multiple built-in frequency response voltage values, and the multiple frequency response parameters of the optimal audio quality played by the first speaker 131 and the second speaker 132 of the speaker module 130 may be collected as the multiple built-in frequency response parameters.

In addition, the target frequency response voltage value may be, for example, the voltage value output by the detector 120 when the headband frame 150 clamps a B&K Type 4128C head and torso simulator (HATS), and the target frequency response parameter may be, for example, obtained by converting the frequency response curve of the optimal audio quality (or specific audio quality) played by the first speaker 131 and the second speaker 132 when the headband frame 150 clamps a B&K Type 4128C HATS, but the disclosure is not limited thereto.

In summary, the headphone and the operation method thereof in the present disclosure may correspondingly and automatically adjust the frequency response parameters for driving the speaker module by detecting the stress changes caused to the headband frame, so that different users with different head sizes are able to receive similar or better audio playback quality.

Finally, it should be noted that: the above embodiments are only used to illustrate the technical solution of the present disclosure, but not to limit the disclosure; although the present disclosure has been described in detail with reference to the foregoing embodiments, those of ordinary skill in the art should understand that the technical solutions described in the foregoing embodiments can still be modified, or some or all of the technical features can be equivalently replaced; and these modifications or replacement do not deviate the essence of the corresponding technical solutions from the scope of the technical solutions to be protected by the embodiments of the present disclosure.

What is claimed is:

1. A headphone comprising:

a headband frame;

a speaker module disposed on the headband frame;

a detector disposed in the headband frame and disposed to detect a stress change on the headband frame to output a frequency response voltage value; and a controller electrically connected to the speaker module and the detector, and disposed to receive the frequency response voltage value, wherein the controller determines whether the frequency response voltage value is the same as a target frequency response voltage value to read a target frequency response parameter corresponding to the target frequency response voltage value to drive the speaker module.

2. The headphone according to claim 1, wherein in response to the controller determining that the frequency response voltage value is the same as the target frequency response voltage value, the controller drives the speaker module using the target frequency response parameter corresponding to the target frequency response voltage value, wherein in response to the controller determining that the frequency response voltage value is not the same as the target frequency response voltage value, the controller selects a built-in frequency response parameter of a built-in frequency response voltage value that is closest to or the same as the frequency response voltage value from a database to drive the speaker module.

3. The headphone according to claim 1, wherein the controller pre-determines whether the frequency response voltage value is greater than or equal to a voltage threshold to determine whether to further determine whether the frequency response voltage value is the same as the target frequency response voltage value.

4. The headphone according to claim 1, further comprising:

a first stretching mechanism;

a first earmuff disposed at one end of the headband frame through the first stretching mechanism;

a second stretching mechanism; and a second earmuff disposed at the other end of the headband frame through the second stretching mechanism, wherein the detector is disposed in a headband region of the headband frame, and the headband region is a preset proportional region corresponding to a preset height of the headband frame from a headband center point to an earmuff center point between the first earmuff and the second earmuff.

5. The headphone according to claim 4, wherein when the first stretching mechanism and the second stretching mechanism are in an unstretched state, there is a first height from the headband center point to the earmuff center point, and when the first stretching mechanism and the second stretching mechanism are in a completely stretched state, there is a second height from the headband center point to the earmuff center point, wherein the preset height is between a first reference height and a second reference height, the first reference height is equal to a result of multiplying the first height by a preset ratio, and the second reference height is equal to a result of multiplying the second height by the preset ratio.

6. The headphone according to claim 5, wherein the first height is 122 mm, and the second height is 146 mm.

7. The headphone according to claim 5, wherein the preset ratio is 20%.

8. The headphone according to claim 4, wherein the speaker module comprises:

a first speaker electrically connected to the controller, and disposed in the first earmuff; and a second speaker electrically connected to the controller, and disposed in the second earmuff.

9. The headphone according to claim 1, wherein the detector is a stress detector.

10. The headphone according to claim 1, wherein the detector is a force-sensitive resistor.

11. An operation method of a headphone, wherein the headphone comprises a headband frame, a speaker module, a detector and a controller, wherein the speaker module is disposed on the headband frame, and the detector is disposed in the headband frame, wherein the operation method comprises:

detecting a stress change on the headband frame through the detector to output a frequency response voltage value;

receiving the frequency response voltage value through the controller;

determining whether the frequency response voltage value is the same as a target frequency response voltage value through the controller to read a target frequency response parameter corresponding to the target frequency response voltage value; and driving the speaker module according to the target frequency response parameter through the controller.

12. The operation method according to claim 11, wherein determining whether the frequency response voltage value is the same as the target frequency response voltage value through the controller comprises:

in response to the controller determining that the frequency response voltage value is the same as the target frequency response voltage value, the controller drives the speaker module using the target frequency response parameter corresponding to the target frequency response voltage value; and in response to the controller determining that the frequency response voltage value is not the same as the target frequency response voltage value, the controller selects a built-in frequency response parameter of a built-in frequency response voltage value that is closest to or the same as the frequency response voltage value from a database to drive the speaker module.

13. The operation method according to claim 11, further comprising:

pre-determining whether the frequency response voltage value is greater than or equal to a voltage threshold through the controller to determine whether to further determine whether the frequency response voltage value is the same as the target frequency response voltage value.

14. The operation method according to claim 11, wherein the headphone further comprises a first earmuff, a second earmuff, a first stretching mechanism and a second stretching mechanism, wherein the first earmuff is disposed at one end of the headband frame through the first stretching mechanism, and the second earmuff is disposed at the other end of the headband frame through the second stretching mechanism, wherein the detector is disposed in a headband region of the headband frame, and the headband region is a preset proportional region corresponding to a preset height of the headband frame from a headband center point to an earmuff center point between the first earmuff and the second earmuff.

15. The operation method according to claim 14, wherein when the first stretching mechanism and the second stretching mechanism are in an unstretched state, there is a first height from the headband center point to the earmuff center point, and when the first stretching mechanism and the second stretching mechanism are in a completely stretched state, there is a second height from the headband center point to the earmuff center point, wherein the preset height is between a first reference height and a second reference height, the first reference height is equal to a result of multiplying the first height by a preset ratio, and the second reference height is equal to a result of multiplying the second height by the preset ratio.

16. The operation method according to claim 15, wherein the first height is 122 mm, and the second height is 146 mm.

17. The operation method according to claim 15, wherein the preset ratio is 20%.

18. The operation method according to claim 14, wherein the speaker module comprises a first speaker and a second speaker, the first speaker is electrically connected to the controller, and is disposed in the first earmuff, the second speaker is electrically connected to the controller, and is disposed in the second earmuff.

19. The operation method according to claim 11, wherein the detector is a stress detector.

20. The operation method according to claim 11, wherein the detector is a force-sensitive resistor.

* * * * *